Sept. 4, 1934.　　　　　L. D. MORSE　　　　　1,972,407
HARVESTER
Filed Oct. 10, 1933　　5 Sheets-Sheet 1

INVENTOR
*L.D.Morse*
BY
ATTORNEY

Sept. 4, 1934.  L. D. MORSE  1,972,407
HARVESTER
Filed Oct. 10, 1933    5 Sheets-Sheet 2

INVENTOR
L. D. Morse
BY
ATTORNEY

Sept. 4, 1934.    L. D. MORSE    1,972,407
HARVESTER
Filed Oct. 10, 1933    3 Sheets-Sheet 3

INVENTOR
L. D. Morse
BY
ATTORNEY

Sept. 4, 1934.   L. D. MORSE   1,972,407
HARVESTER
Filed Oct. 10, 1933     5 Sheets-Sheet 4

INVENTOR
L.D.Morse
BY
ATTORNEY

Sept. 4, 1934.  L. D. MORSE  1,972,407
HARVESTER
Filed Oct. 10, 1933  5 Sheets-Sheet 5

INVENTOR
L. D. Morse
BY
ATTORNEY

Patented Sept. 4, 1934

1,972,407

UNITED STATES PATENT OFFICE 1,972,407

HARVESTER

Lyman D. Morse, Butte City, Calif.

Application October 10, 1933, Serial No. 692,958

15 Claims. (Cl. 56—364)

This invention relates to agricultural machinery of the general type classed as harvesters and deals particularly with the gathering of the cut grain lying on the ground and the delivering of the same to the threshing cylinder of the harvester.

As at present constructed the pick up and conveying mechanism of the harvester is disposed to one side of the body or separator of the same. This arrangement not only makes the machine very wide so that its movement from one field to another through gates etc. is frequently a difficult matter, but it necessitates the use of a lateral draper and the grain as initially delivered onto the draper tends to pile up behind the back side of the same and the proper and even feeding to the cylinder is interfered with.

The main object of my invention is to eliminate the above objectionable features of construction by providing a draper structure which projects straight ahead from the cylinder to the ground so that the grain as picked up will be delivered to the cylinder without change of direction and without any tendency to clog at any point. The draper structure is arranged so that while it is relatively wide at the ground end, so as to pick up grain from a corresponding ground area, it is no wider at the cylinder end than the intake mouth of the feed box. Also the grain deposited on the wide portion of the draper is gradually and automatically confined or restricted as to its width as it is conveyed toward the cylinder so that it is fed into the latter in a compact mass and yet without any tendency to become jammed or clogged adjacent the entrance. Since the draper structure is always longitudinally alined with the separator body of the harvester the total width of the harvester need be but little greater than that of the draper itself.

If the harvester is not self propelled the above arrangement necessitates placing the hauling tractor to one side and ahead of the draper. Another object of my invention therefore is to so connect the tractor to the harvester that when it is desired to transport the same, the tractor may be easily shifted so that it occupies a position directly in line with the draper, so that the width of the structure at such times is not increased by that of the tractor.

In connection with the above features I have provided means for adjusting the harvester to side hill work, so that the separator will remain horizontal while the draper is parallel to the transverse slope of the ground. I have also provided means to adjust the draper structure vertically to different positions relative to the separator, and to adjust the latter in a vertical plane lengthwise and relative to the draper as the ground contour may require for proper operation of the separator mechanisms.

These objects I accomplish by means of such structure and relative arrangement of parts as will fully appear by a perusal of the following specification and claims.

In the drawings similar characters of reference indicate corresponding parts in the several views:

Fig. 1 is a top plan view of the complete structure, showing only the forward portion of the separator.

Figure 2:
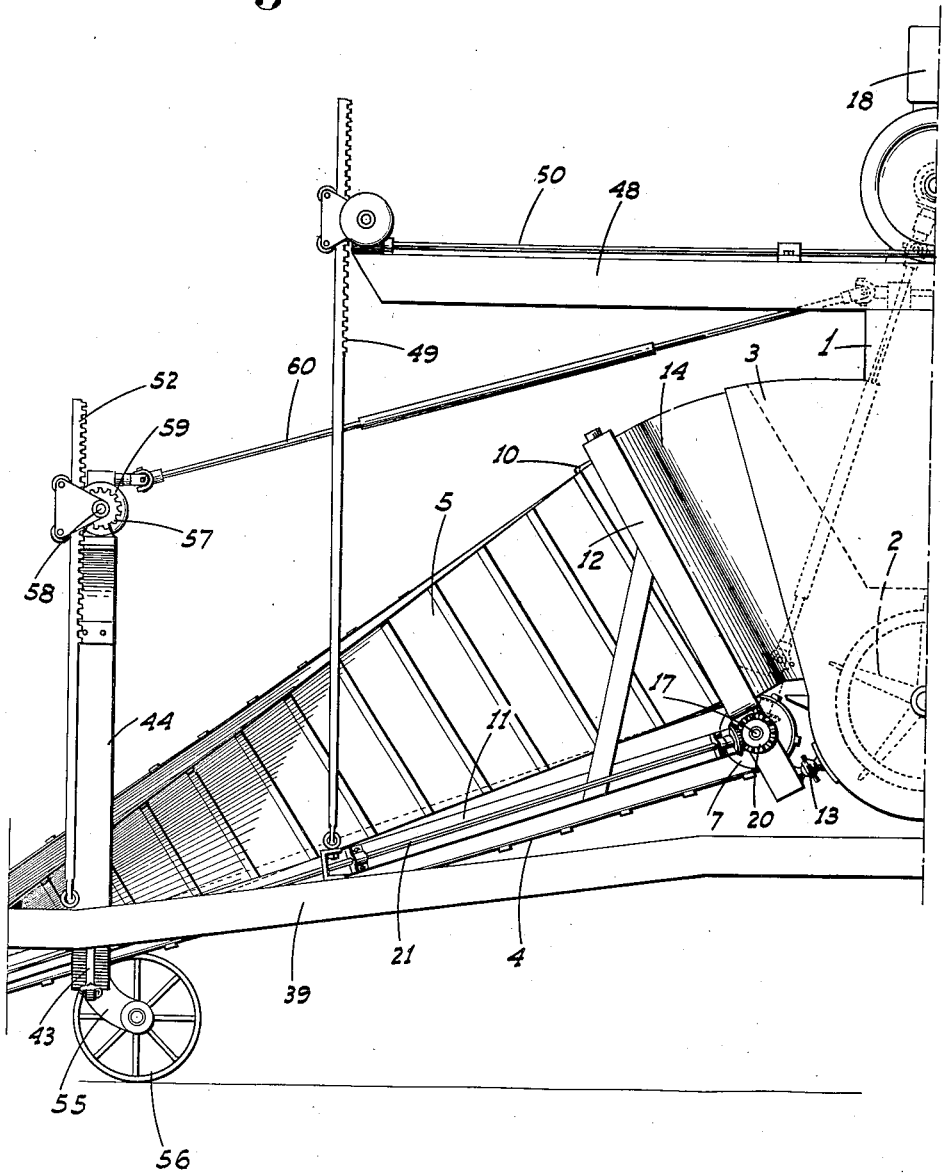
Fig. 2 is a fragmentary side elevation of the structure showing the mounting and adjustment means for the draper and the longitudinal tilt adjustment means for the separator.
Figure 3:
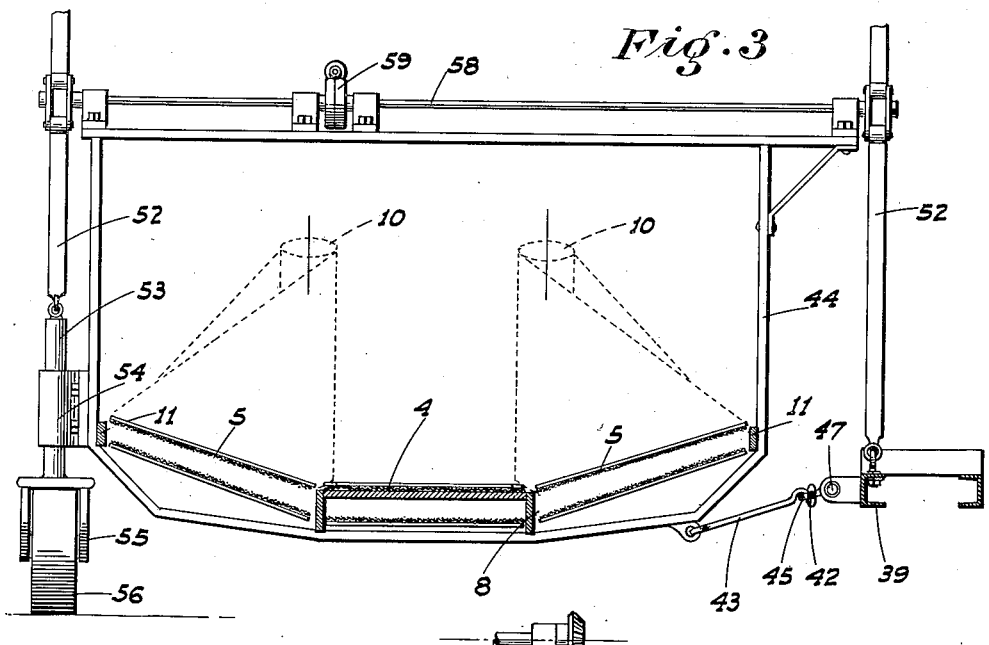
Fig. 3 is a transverse vertical section of the draper structure taken on the line 3—3 of Fig. 1.
Figure 4:
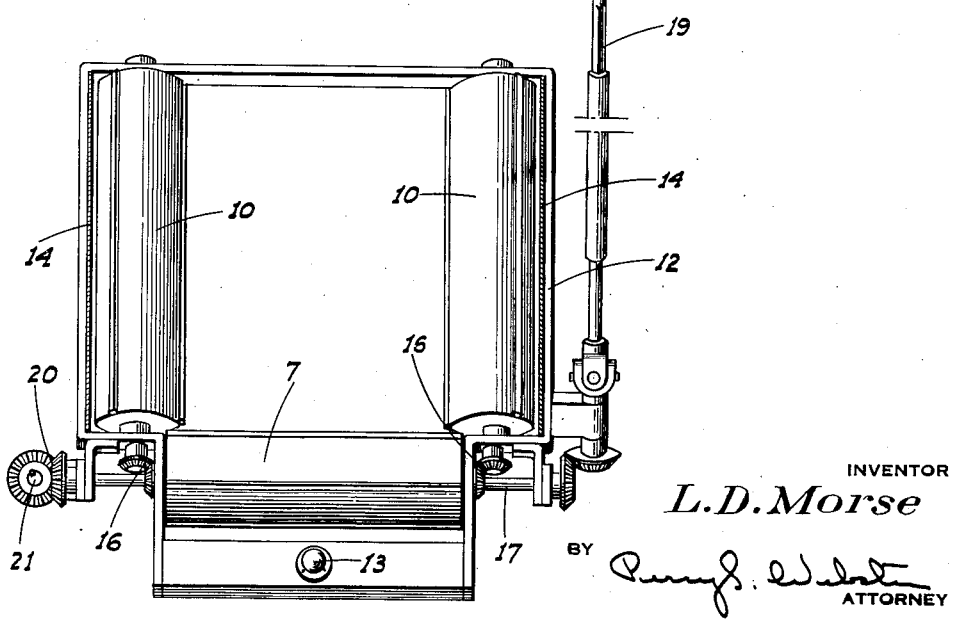
Fig. 4 is an end view of the upper end of the draper structure looking forward.
Figure 5:
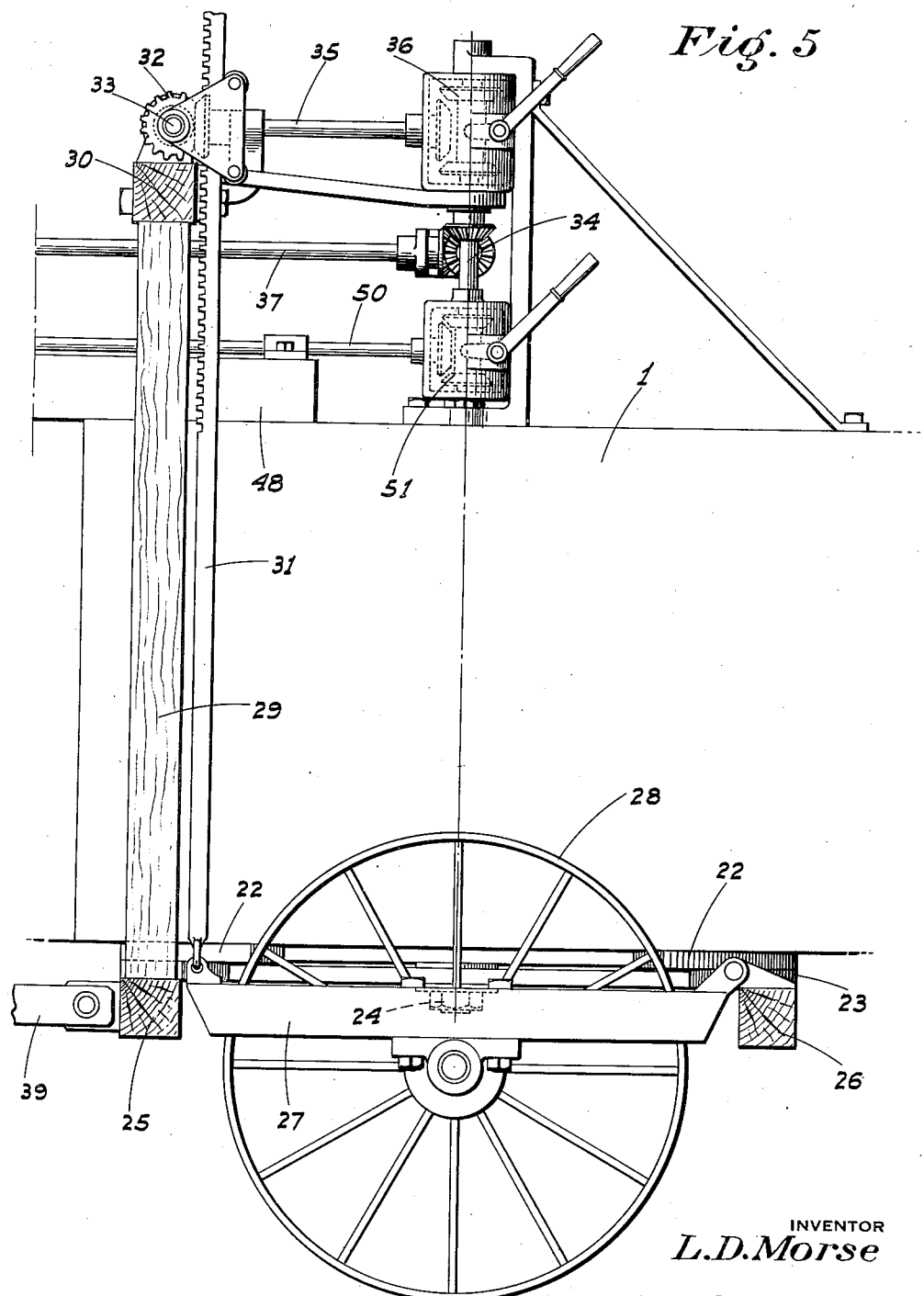
Fig. 5 is an enlarged fragmentary side view showing the mounting and adjustment means for the separator supporting wheels.
Figure 6:
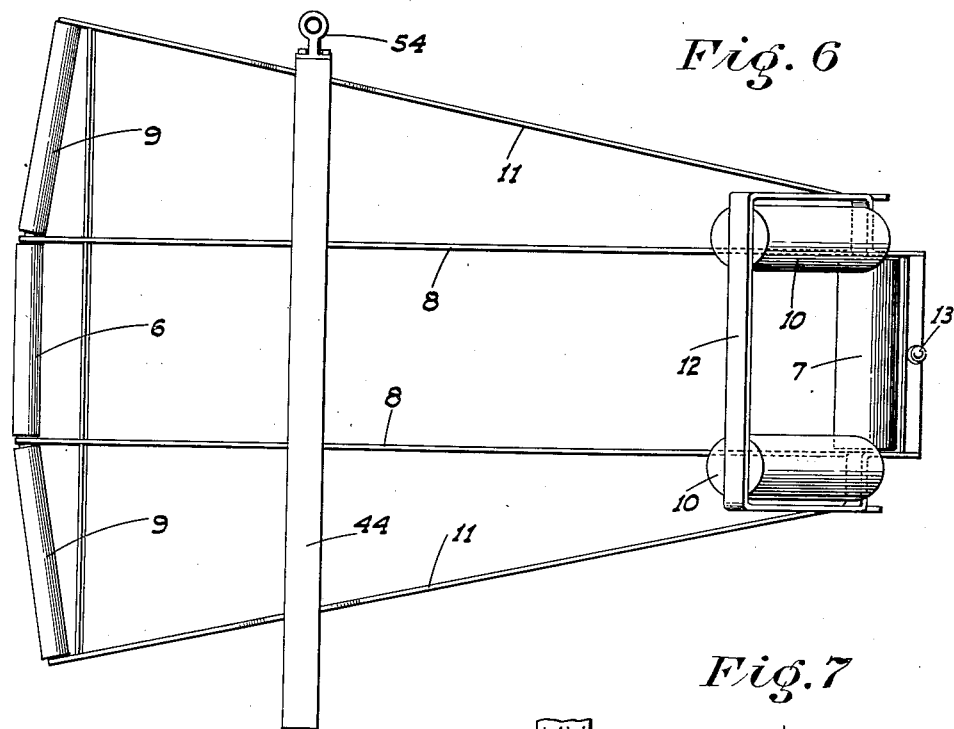
Fig. 6 is a top plan of the draper frame and roller unit.

Referring now more particularly to the characters of reference on the drawings, the separator body 1 and the separator mechanisms therein are of conventional character which it is of course unnecessary to show. The usual threshing cylinder 2 is disposed in the body adjacent its forward end, entrance to which is had through a forwardly facing feed box or house 3.

The draper structure by which the grain is fed into the box depends from the forward end of the same and comprises a central longitudinally extending draper 4 and side drapers 5. The central draper is mounted on transversely extending front and rear rollers 6 and 7 respectively supported by suitable longitudinally extending frame elements 8. The side drapers are mounted on transversely extending front rollers 9 and vertical rear rollers 10. The latter at their lower end overhang the side edges of the roller 7 directly above the same and have a forward slant toward their upper end in the longitudinal plane of the draper structure. The drapers 5 which are of course of flexible material therefore change from a horizontal position at their forward end to a vertical position at their rear end. Thus while the drapers as a whole cover a wide ground area at their forward end, the grain delivered onto such end is gradually shifted laterally and confined on the central draper between the vertical runs of the side drapers, whose spacing at the rear end is somewhat less than the width of the feed box.

The rollers 9 are journaled in the frames 8 and in outside longitudinal frame elements 11 tied to the frames 8, while the rollers 10 are journaled in a vertical yoke frame 12 which is rigid with the adjacent ends of the frame elements 8 and 11, so that a rigid unitary structure is formed. The yoke frame just under the rear side of the roller 7 is supported from the cylinder housing below the intake opening thereof by a centrally located universal joint 13 which may be of the ball and socket or other suitable type.

Vertical grain confining or guide plates 14 are secured to the yoke frame 12 and extend closely about the rear sides of the vertical rollers 10 and thence into the feed box in lateral clearance relation thereto. In this manner no grain can pass about the said rollers toward the outer faces of the same, while no grain can be lost through the gap between the rollers and the feed box and which must be left on account of the necessary adjustment of the draper structure relative to the separator at times.

A pick up device 15 of standard character is mounted in connection with the draper unit at its forward end and overhangs all three drapers, being of course for the purpose of picking up the cut grain from the ground and delivering it onto the drapers over the full width of the same.

The rollers 7 and 10 are geared together at their adjacent ends as at 16 to rotate at the same speed, and the shaft 17 of the roller 7 is driven from an engine 18 mounted on top of the separator at the front by a suitable flexible drive unit 19. The pick up mechanism is also driven from the shaft 17 by suitable means such as gearing 20 and a drive shaft 21 extending along the adjacent frame 11. The engine of course also operates the threshing and separator mechanisms as usual.

The separator mechanism adjacent its forward end but back of the engine is adjustably supported on wheels in the following manner.

Secured on and under the body are turntable segments 22 cooperating with relatively movable segments 23, the turntable parts being connected by an axial king bolt 24. The segments 23 are rigidly secured on the front and rear transverse beams 25 andd 26 which of course extend under the separator body and beyond the sides of the same. Swing frames 27 in which ground engaging wheels 28 are mounted are hingedly connected to the beams 26 to the sides of the body 1.

Vertical beams 29 are secured on and upstand from the beam 25 adjacent its ends and support another transverse beam 30 above the separator, so that beams 26 and 30 are parallel and are connected as a rigid unit. Racks 31 are connected at their lower ends to the forward ends of the swing frames and project upwardly and above the beam 30, being engaged by pinions 32 mounted on a shaft 33 journaled on the beam 30.

The shaft 33 is driven from a vertical counter shaft 34 mounted on top of the body 1 in axial alinement with the king bolt 24 by suitable drive connections 35 which include a manually controlled reverse mechanism indicated at 36. In this manner the direction of rotation of the shaft 33 and consequently the direction of movement of the racks may be reversed at will. It is of course understood that the pinions and racks are arranged so that when one swing frame moves up the other one moves down and vice versa as is common practice. When the harvester is operating the shaft 34 is constantly driven from the engine 18 by suitable drive connections therebetween such as indicated at 37. This arrangement enables the swing frames to turn as a unit about the turntable as an axis without disturbing the adjustment mechanism of the frames in any way as will be evident.

A double or wishbone tongue 39 is pivoted on the beam 25 so as to swing laterally therewith and extends forwardly at right angles thereto. At its forward end the tongue is pivotally connected to and supported by the drawing head 40 of a tractor 41, which when the harvester is in operation is disposed to one side of and ahead of the draper unit as indicated in Fig. 1. The tongue thus lies at a forward angle to the longitudinal plane of the draper and harvester and is to one side of the draper. The tongue being rigid with the swing frames and their supporting elements, the wheels are also of course canted laterally relative to the longitudinal plane of the separator and the harvester as a whole.

Figure 7:
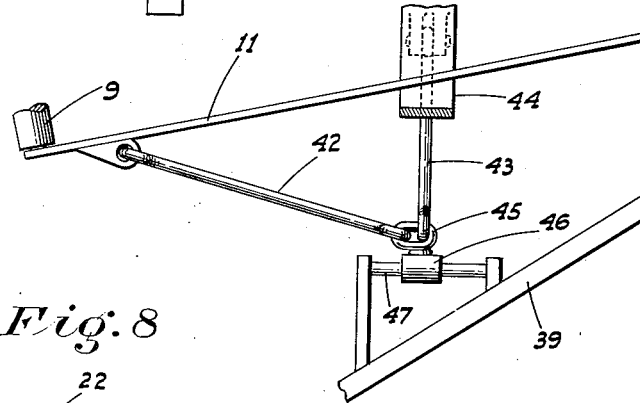
Fig. 7 is a fragmentary top plan view showing the flexible connection between the tractor supported tongue and the draper frame.
Figure 8:
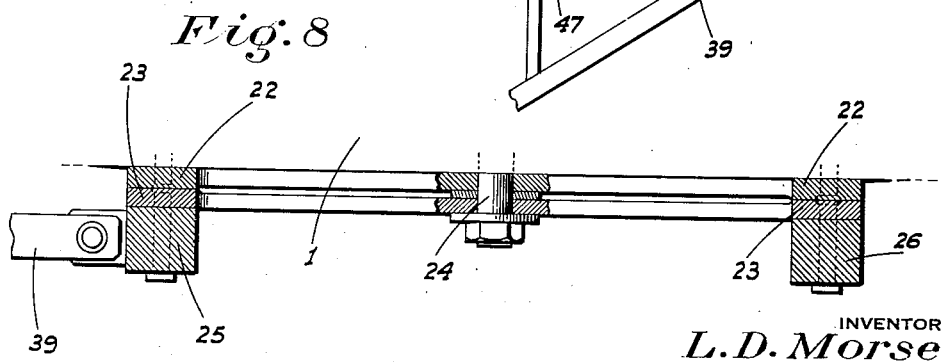
Fig. 8 is a longitudinal section of the turntable between the separator body and the swing frame supports.

The tongue is held at such diverging angle relative to the draper unit and is flexibly connected to the same by a longitudinally extending link 42 swivelly connected at one end to the adjacent draper frame 11 and by a longitudinally extending link 43 swivelly connected at one end to the under portion of a substantially vertical yoke frame 44 which is rigid with the draper frames and extends over all three drapers. At their outer ends the links are detachably hooked to an eye 45 which is on a sleeve or spool 46 slidable and turnable on a rod 47 supported on the adjacent side of the tongue and extending lengthwise of and parallel to the draper. This construction is particularly shown in Fig. 7 and permits of a certain flexible vertical movement of the draper relative to the tongue while holding them against relative lateral displacement.

A rigid beam 48 extends forwardly from the top of the separator in overhanging relation and parallel to the tongue. A rack 49 depends from the forward end of the beam to a detachable connection with the tongue. The rack is engaged by a pinion P mounted on the beam and which is rotated in either direction at will by suitable drive connections as at 50 preferably operated from the shaft 34 with a manually controlled reverse mechanism 51 interposed therein. By means of this arrangement it will be seen that the separator body may be tilted up or down about the wheels as an axis so that the separator may be maintained horizontal in a longitudinal plane regardless of the level of the ground.

The draper unit may be tilted up or down so as to alter its level relative to the ground at its forward end by means of racks 52 disposed to the sides of the frame 44 and projecting above the same. One rack is detachably connected at its lower end to the tongue 39 while the other rack is connected to the upper end of a stem 53 which is slidably and turnably mounted in a bracket 54 secured to the frame 44 on the side thereof opposite the tongue. This stem has a fork 55 in which a caster wheel 56 is mounted and which of course engages the ground. Pinions 57 engage the racks, said pinions being mounted on a shaft 58 journaled on the top cross bar of the frame 44. Rotation of the shaft 58 is controlled by suitable means such as worm gearing indicated at 59, the work of which is connected to an extensible and universal jointed shaft 60 which extends to the top of the separator body to a point of convenient manual control as indicated in Fig. 1. The universal joint connection 13 between the draper structure and the separator body enables the draper and separator to be tilted lengthwise without interfering with each other and allows the separator to be tilted transversely without correspondingly tilting the draper, the clearance between the guide plates 14 and the feed box being sufficient to permit of the necessary relative tilting movement in any direction.

When it is desired to transport the harvester the links 42 and 43 are disengaged from the eye 45, the rack 49 is disengaged from the tongue and the draper is jacked up so that its forward end is above the level of the tongue. The tongue is then swung around so as to pass under the draper which may then be lowered to rest on said tongue. The wheels 28 of course straighten out with this swinging of the tongue and the tractor is directly in front of the draper and in longitudinal alinement with the machine as a whole. As a result the entire structure is then but little wider than the draper and will not occupy an unduly wide space on a roadway.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A harvester including a separator body having a threshing cylinder and a feed box giving access thereto, a draper structure projecting forwardly and downwardly from the feed box, a draft tongue projecting forwardly from the body at an acute angle to the longitudinal plane of the harvester and terminating to one side of and ahead of the draper structure for attachment to a tractor, means mounting the draper structure for raising movement at its forward end whereby it may be elevated above the tongue, and means mounting the tongue in connection with the body for swinging movement in a horizontal transverse plane whereby it may be moved under the draper structure when the latter is elevated.

2. A harvester including a separator body having a threshing cylinder and a feed box giving access thereto, a draper structure projecting forwardly and downwardly from the feed box, a draft tongue projecting forwardly from the body at an acute angle to the longitudinal plane of the harvester and terminating to one side of and ahead of the draper structure for attachment to a tractor, means for elevating the draper structure above the tongue, means mounting the tongue in connection with the body for swinging movement in a horizontal transverse plane whereby it may be moved under the draper structure when the latter is elevated, and releasable means normally holding the tongue at said angle.

3. A harvester including a separator body having a threshing cylinder adjacent its forward end and a forwardly facing feed box giving access thereto, a draper structure projecting forwardly and downwardly from the feed box, a universal joint connection between the structure and body at their adjacent ends, means to tilt the body relative to the ground in a transverse plane, and means to maintain the draper structure parallel to the ground in a transverse plane.

4. A harvester including a separator body having a threshing cylinder and a feed box giving access thereto, and a draper structure projecting forwardly and downwardly from the feed box, said draper structure at its rear upper end being substantially the width of the feed box and widening out to its forward end to a width greater than that of the feed box.

5. A harvester including a separator body having a threshing cylinder and a feed box giving access thereto, a draper structure projecting forwardly and downwardly from the feed box, said structure comprising a central and side drapers, the width of the central draper being substantially that of the feed box, and means mounting the side drapers so that while their lower forward ends are horizontal and substantially alined with the adjacent end of the central draper, their upper rear ends lie in vertical transverse planes adjacent the side edges of the central draper at its rear end.

6. A harvester including a separator body having a threshing cylinder adjacent its forward end and a forwardly facing feed box giving access thereto, a draper structure projecting forwardly and downwardly from the feed box, said structure comprising endless central and side drapers, the width of the central draper being substantially that of the feed box, horizontal rollers about which the side drapers pass at their lower forward ends to maintain such ends in substantial alinement with the adjacent end of the central draper, and rollers substantially vertical in a transverse plane about which the side drapers pass at their upper ends, the inner faces of the last named rollers lying in planes adjacent the side edges of the central draper.

7. A structure as in claim 6, with a unitary frame structure in which all said drapers and rollers are mounted.

8. A harvester including a separator body having a threshing cylinder and a feed box giving access thereto, a draper structure projecting forwardly and downwardly from the feed box, said structure at its lower forward end being relatively wide compared to the width of the feed box, and means formed with the structure to gradually deflect grain initially deposited thereon laterally and toward the central portion of said structure and confine the grain on such portion as said grain is conveyed toward the feed box.

9. A harvester including a separator body having a threshing cylinder adjacent its forward end and a forwardly facing feed box giving access thereto, a draper structure projecting forwardly and downwardly from the feed box, pivot means mounting the structure in connection with the body for longitudinal swinging movement in a vertical plane, a forwardly projecting tongue connected at its rear end to the body and adapted at its other end for supporting engagement with a tractor, said tongue extending to one side of the draper structure, a ground engaging wheel mounted for relative vertical adjustment on the side of the structure opposite the tongue, and means between the structure and the tongue and wheel to raise and lower the structure about said pivot mounting means as an axis.

10. A harvester including a separator body, swing frames disposed to the sides of the body, wheels supported in said frames, means pivoting said frames as a unit on the body for swinging movement in a horizontal plane, a draft tongue connected to and projecting forwardly from said means for swinging movement therewith, and means to vertically adjust said swing frames at will.

11. A harvester including a separator body, swing frames disposed to the sides of the body, wheels supported in said frames, means pivoting said frames as a unit on the body for swinging movement in a horizontal plane, a draft tongue connected to and projecting forwardly from said means for swinging movement therewith, and means to vertically adjust said swing frames at will from above the body and irrespective of the lateral position of the same relative to the body.

12. A harvester including a separator body, swing frames disposed to the sides of the body, wheels supported in said frames, transverse beams under the body extending across the ends of the frames, means pivoting said frames on one beam, means connecting said beams as a unit and mounted on the body for swinging movement in a horizontal plane, a draft tongue connected to and extending forwardly from the front beam for swinging movement therewith, an upper beam above the body parallel to and directly above the other transverse beam, means rigidly connecting said last named beams, racks depending from the upper beam to the adjacent ends of the swing frames, and pinions mounted on the upper beam and engaging the racks.

13. A structure as in claim 12, with a drive shaft mounted on the body, and drive connections between the shaft and pinion to rotate the latter irrespective of the position of the beams relative to the body.

14. In a harvester, having a body, a draft tongue projecting forwardly from the body, means mounting the tongue on the body for swivel movement in a horizontal plane, and means to normally hold the tongue at an acute angle to the longitudinal plane of the harvester.

15. In a harvester, having a body, a draft tongue projecting forwardly from the body, a turntable structure connecting the body and tongue whereby the latter may swing in a horizontal plane, wheels mounted on the tongue connected member of the turntable, and means to normally hold the tongue at an acute angle to the longitudinal plane of the harvester.

LYMAN D. MORSE.